W. A. RICE.
PROCESS OF AND APPARATUS FOR SEPARATING AND POLISHING SEEDS.
APPLICATION FILED JUNE 28, 1920.

1,411,519.

Patented Apr. 4, 1922.
2 SHEETS—SHEET 1.

Inventor:
William A. Rice.
By John C. Higdon
Atty.

W. A. RICE.
PROCESS OF AND APPARATUS FOR SEPARATING AND POLISHING SEEDS.
APPLICATION FILED JUNE 28, 1920.

1,411,519.

Patented Apr. 4, 1922.
2 SHEETS—SHEET 2.

Inventor:
William A. Rice.
By John C. Higdon
Att'y

UNITED STATES PATENT OFFICE.

WILLIAM A. RICE, OF JERSEYVILLE, ILLINOIS.

PROCESS OF AND APPARATUS FOR SEPARATING AND POLISHING SEEDS.

1,411,519.  Specification of Letters Patent.  Patented Apr. 4, 1922.

Application filed June 28, 1920. Serial No. 392,410.

*To all whom it may concern:*

Be it known that I, WILLIAM A. RICE, a citizen of the United States, residing at Jerseyville, in the county of Jersey, State of Illinois, have invented certain new and useful Improvements in Processes of and Apparatus for Separating and Polishing Seeds, of which the following is a specification containing a full, clear, and exact description, reference being had to the accompanying drawings, forming a part hereof.

My invention consists in the novel disclosure hereinafter particularly described and distinctly claimed.

The object of my invention is to provide an improved process of and machine for separating and polishing seed, whereby clover seed and other forms of seed may be quickly and efficiently separated from buckhorn and other mucilaginous seeds.

An especial object of my invention is to avoid the over "wetting" of the seed,—in fact to use as little water or moisture as possible in the process of separation.

I have discovered, after much experimentation, that if a mixture of clover-seed and buckhorn-seed is first simultaneously moistened and agitated the buckhorn-seed will absorb all excess of moisture from the said clover-seed, and thereby partially dry all of the seeds, but will leave the buckhorn seed in a sticky condition; then, secondly, if said partially-dry mixture of seeds is mixed with a quantity of dry sawdust and further agitated the said clover-seed will be thereby completely dried by attrition of the kernels of the seeds with the particles of sawdust, the buckhorn-seed will adhere to said particles of sawdust, and will be separated from said clover-seed; and then, finally, if the light partially dry sawdust and the buckhorn-seed adhering thereto, together with the separated clover-seed, are directly discharged from a combined agitating and driving chamber into an upwardly-moving blast of air, the light free particles of sawdust will be thrown upwardly (or away from) the seed, and the heavier parts of mixed sawdust and seed will drop into a suitable receptacle, whence they can be transferred to the usual fanning-mill or common screens, the employment of any heating-apparatus whatever will be unnecessary, and is entirely dispensed with in carrying out my invention.

Heretofore, in all machines and processes for separating clover-seed from buckhorn and other mucilaginous seed known to me, there has been used (and has been necessary) an excess of water to thoroughly "soak" and "wet" the seed and the sawdust, which has necessitated the provision and use of an expensive heating-apparatus, for drying the still-wet mixture of seed and sawdust as it is discharged from the mixing devices.

In contradistinction to the machines and processes of the prior art, my invention requires no heating apparatus for drying the seed, inasmuch as the drying thereof is effected solely by attrition of the kernels and sawdust particles, and thereby every particle of moisture is wiped off of the clover-seed previous to their discharge from the combined agitating and drying chamber (or box), so that a further drying by heat is unnecessary, and would be injurious to the clover-seed, as I have found by practical experience.

Figure 1:
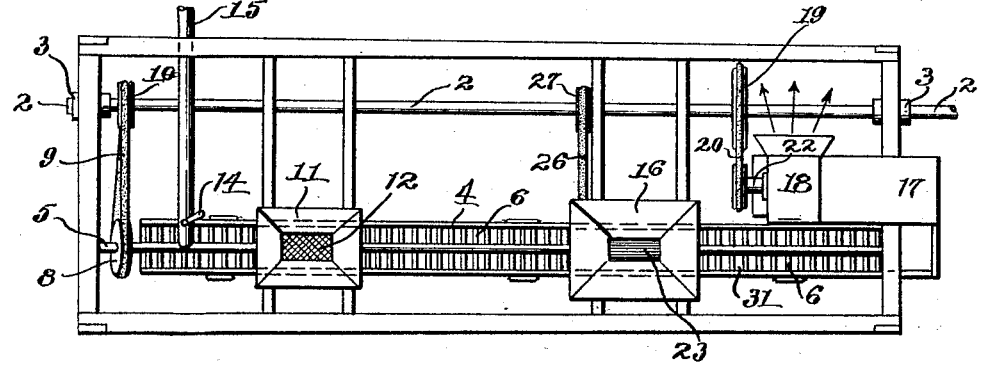
Fig. 1 is a top plan-view of a machine used in carrying out my invention.
Figure 2:
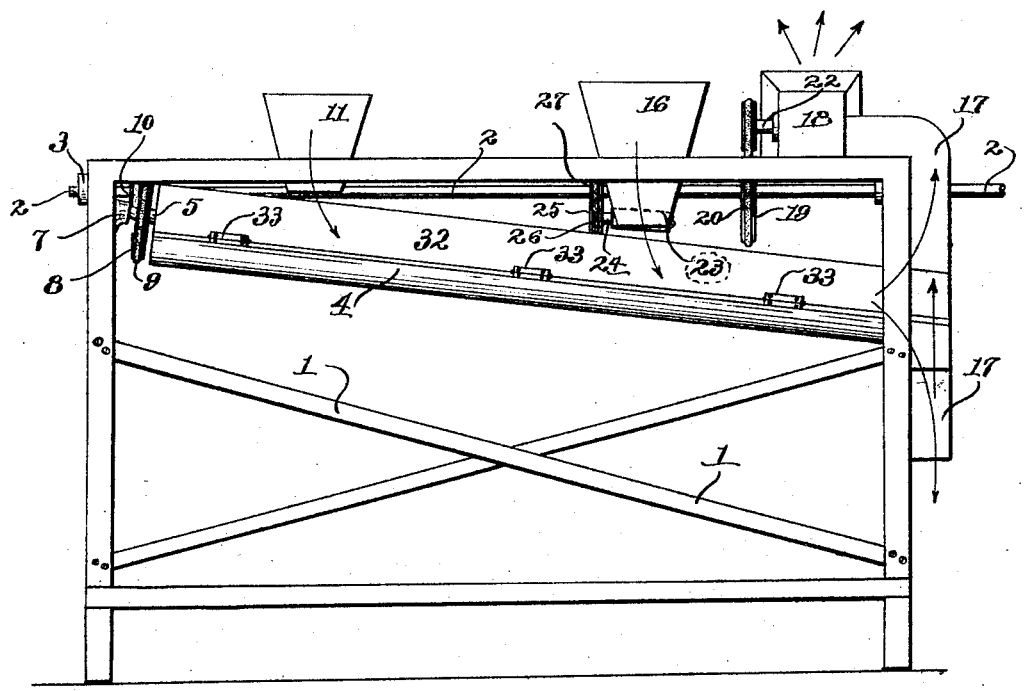
Fig. 2 is a side-elevation of the same machine.

In the present illustration of apparatus for carrying out my invention, I have provided a suitable rectangular supporting frame, which may be made of wood or metal, and which has vertical corner-posts, horizontal bars, and braces 1.

A drive-shaft 2 is mounted in bearings 3, and extends horizontally from end-to-end of said frame, at or near the upper part of the latter.

Said drive-shaft is to be driven by any suitable power connected to it by a pulley and belt, or a motor (not shown) may be connected directly to one end of said shaft, or the latter may be driven by hand in small machines.

A combined seed-moisting, mixing, drying, and conveying box or chamber 4, extends almost the full length of the said frame, near the top thereof; and said box is preferably inclined downwardly from its feed end to its discharge end, so that the seed and other material contained therein will be assisted by gravity in passing through said box.

A toothed-cylinder, or shaft 5 carrying a series of radial teeth or paddles 6, is mounted in suitable bearings 7 and extends throughout the length of said box.

The said box or chamber 4 may be also termed a conveyer, inasmuch as the seed and other materials are conveyed by it from the point of entrance to the point of discharge.

However, I prefer to call the said toothed-cylinder an agitator, as well as a conveying device.

Motion is communicated to the said agitator-shaft 5 by a common pulley 8 that is fixed thereon at the upper portion of same, and over which a belt or chain 9 passes.

Said belt or chain 9 also passes over a common pulley 10 that is fixed upon the said drive-shaft 2, for the purpose of driving the said agitator-shaft 5.

The seed to be separated and polished are fed to the upper portion of the said combined seed-moistening, mixing, drying and conveying box 4, from a hopper 11 that is preferably provided with a screen 12, the purpose of which latter is obviously to prevent the passage of objectionable materials to the said box.

When the said toothed-cylinder 5 is caused to revolve, the seed flow from said hopper 11, and at the same time a small stream of water is allowed to flow from a faucet 14 attached to a water-supply pipe 15, and the seed and water will be thoroughly mixed, and will then be conducted beneath a sawdust hopper 16, from which latter flows a stream of sawdust, which in turn is thoroughly mixed with the previously-moistened seed, and such mixed sawdust and seed escape from the lower end of said mixing-box into an air blast chamber 17, within which the light sawdust is drawn off (or upwardly) by the suction of a common fan 18, and the seed and heavier parts of the mixed material will drop through the open bottom of said air-chamber into a box, basket or other container, (not shown), from whence said seed and heavier parts are transferred to the common fanning-mill; or the usual screens may be arranged directly beneath the open bottom of said air-chamber, and the seed may be transferred from said screens (not shown) to the said fanning-mill.

Seeds which are of a mucilaginous nature, such as buckhorn, will become sticky from the moisting operation just described, and upon being brought intimately into contact with the small particles of dry sawdust, will adhere to them and form a ball, which may easily be separated by the usual screen of proper size.

When my invention is to be used upon a large scale, it will be advisable and necessary to provide a means for completely drying the previously partially-dried sawdust, so that same may be used over and over.

The inclination of the said box 4, and the arrangement of the paddles or teeth 6 of the said toothed-cylinder 5, are such that the above-described moistening-process will last but 16 or 17 seconds.

The husk of clover-seed, which is perfect and of an oily nature, will not permit the moisture to penetrate it in so short a time as that above mentioned, and by reason of the fact that said seed are made almost dry by the intimate contact with the primary absorbents (the said mucilaginous seed), and are finally completely dried by the said dry sawdust, the subsequent blast of air, need do nothing more than partially dry the sawdust and separate it, so that the said seed need not be subjected to any further drying; thus there is no injury done to the seed by heating the same.

There is a small percentage of buckhorn seed which are hard, and do not soften sufficiently to collect thereon a sufficient quantity of sawdust to insure their passing over the screen, but it will be noted that they will carry a few adhering particles of sawdust, and may be easily separated by the common buckhorn mill.

Other clover-seed separating processes than mine, and machines using the moistening process, put the sawdust through a drying process before separating the seed therefrom, and that drying is accomplished by heating, which injures the vitality of the seed in many cases.

In my process and apparatus there is no danger of injuring the seed, as no heat is used in drying the seed.

The reason for using a mixer and conveyer with teeth, as above described, is that when the seed are moistened they tend to form into balls of adhering seed, which must be broken up in order that none of the buckhorn seed will escape a thorough moistening; and the same is true in mixing the sawdust with the moistened seed, the sticky nature of the buckhorn seed tending to make them adhere to adjoining seed, to form balls, which must be broken up and be brought intimately into contact with the dry particles of sawdust, which will adhere to the moistened buckhorn seed, notwithstanding the severe whipping by the said teeth or paddles 6, and other particles of sawdust will be brought into contact with the clover-seed, and will absorb all moisture therefrom.

In order to insure complete absorption of moisture from the seed, an excess of sawdust should be used over what would be necessary to make the separation of the buckhorn.

My apparatus, as described, may be used for removing honey-dew from seed, and for polishing seed, beans, etc.

The said fan 18 is driven by any common and well-known means, such as a belt-pulley 19 fixed on the said drive-shaft 2, and a belt 20 engaging said pulley and passing over a smaller pulley 21 fixed on the fan-shaft 22.

Mounted to rotate in the bottom of the said sawdust hopper 16 is a feed-roll 23, whose shaft 24 has a pulley 25 that is driven by a belt 26 running over another pulley 27 carried by the said drive-shaft 2.

Figure 6:
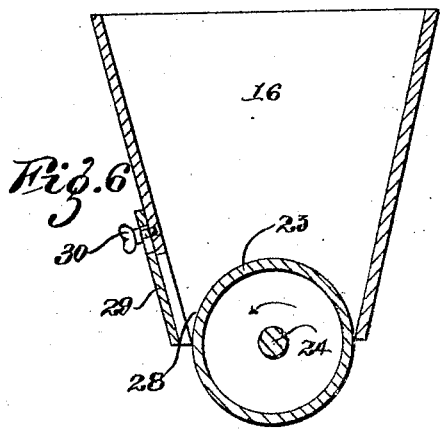
Fig. 6 is a detail vertical section of the sawdust hopper and its feed-roll.

The function of said feed-roll 23 is to agitate the sawdust at the bottom of said hopper 16, and to feed the sawdust into and through a feed opening 28 in a thin stream that is controlled by a slide or common gate 29 mounted to slide over said feed opening, and adjustably secured by means of a common thumb-screw 30. See Fig. 6.

Figure 3:
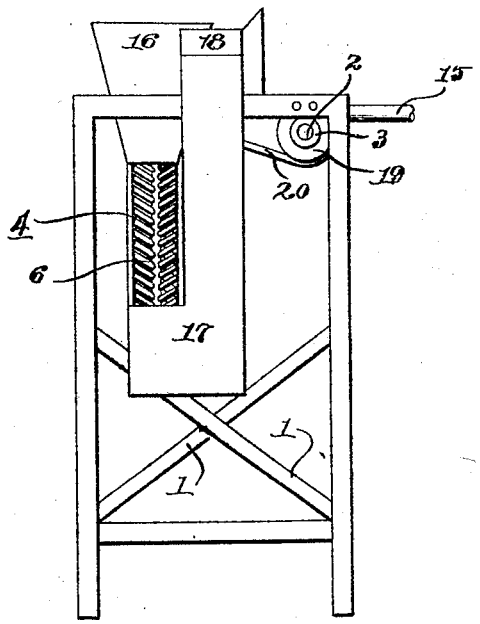
Fig. 3 is an elevation of the delivery-end of same.

An important feature of my invention is an enlargement of the interior of the said mixing and conveying box 4, at the point at which the sawdust is discharged into said box, and to the discharge end of same; inasmuch as more room is thereby provided in said box for the additional bulk of material after the sawdust is deposited, and the mixing of the sawdust with the seed, and the drying of the mixture, is thereby accomplished in a more efficient manner than would be the case were said box devoid of said enlargement. See Fig. 3.

Said enlargement is designated by the numeral 31.

However, said enlargement 31 may be dispensed with in some cases, and it is not shown in Fig. 1.

Figure 4:
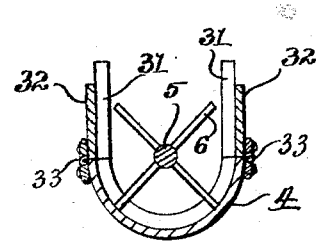
Fig. 4 is a detail cross-section of the combined moistening, mixing, and conveying box, the section being taken on the line 4—4 of Fig. 5.
Figure 5:
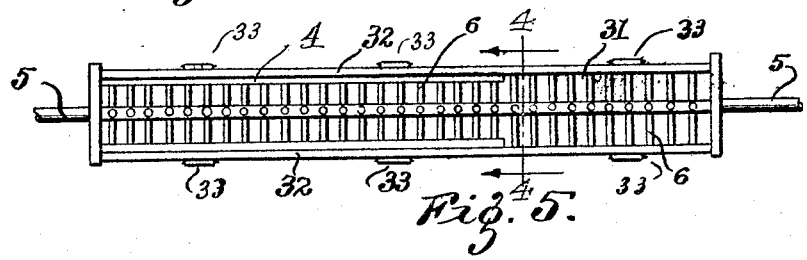
Fig. 5 is a detail top plan-view of the combined moistening, mixing and conveying box, detached from the machine.

The vertical side-walls 32 of the said mixing and conveying box 4 are connected to the body of same by means of common hinges 33, so that said side-walls may be swung outwardly, to permit ready access to the interior of said box, in cleaning and repairing the parts. See Fig. 4.

I claim:—

1. The herein-described process of separating mixed mucilaginous and non-mucilaginous seeds, which consists in first agitating the mixed seeds; then moistening the mixed seeds to a limited degree only while same are in a state of agitation; then continuing the agitation until said non-mucilaginous seeds are partially dried by absorption of moisture therefrom upon attrition therewith of said mucilaginous seeds; then mixing dry sawdust with said partially dried mixed seeds; then agitating the mixed partially dried seeds and the sawdust, until said non-mucilaginous seeds are fully dried by attrition and absorption only; and finally forthwith separating the fully dried seeds and the sawdust, by discharging same directly after the mixing and agitating step into a blast of air, acting upon a continuous mixture of fully dried seeds and sawdust.

2. A non-heating machine for separating mucilaginous seeds from non-mucilaginous seeds, comprising a supporting frame; a mixing and conveying box which is downwardly inclined from its feed end toward its discharge end; means for feeding a mixture of seeds to said box; means for moistening the mixture of seeds in said box; means for feeding dry sawdust to said mixed seeds in said box after said mixture of seeds has been moistened to a limited degree only and partially dried by absorption and attrition before said sawdust has been added; a toothed-cylinder mounted to revolve in said box, and to agitate and partially dry said mixed seeds before said sawdust has been added, and to cause said non-mucilaginous seeds to be completely dried after said sawdust has been added, in said box; an air-blast chamber connected directly to the discharge-end of said box, and into which air-blast chamber the dried seeds and sawdust are directly discharged from said box; and a fan for creating a blast of air in said air-blast chamber.

In testimony whereof I have signed my name to this specification in presence of two subscribing witnesses.

WILLIAM A. RICE.

Witnesses:
Wm. F. Hanley,
Samuel L. McKabney.